April 9, 1940.   H. M. BIEBEL   2,196,380
AUTOMATIC TOASTER
Filed Feb. 20, 1939   2 Sheets-Sheet 1
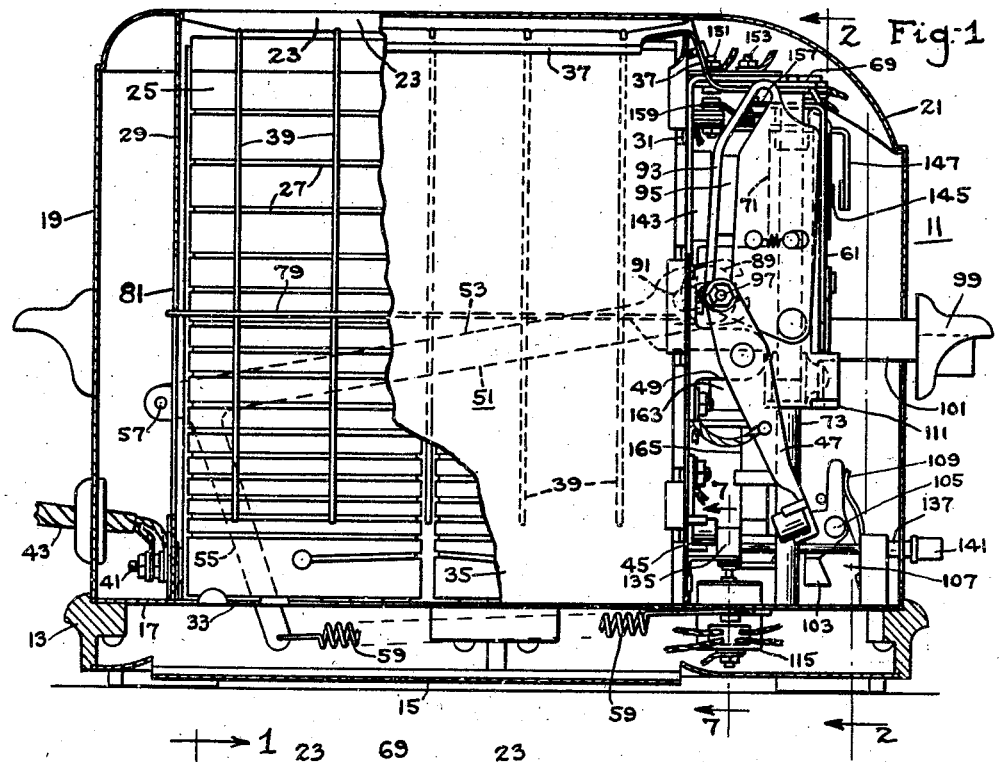
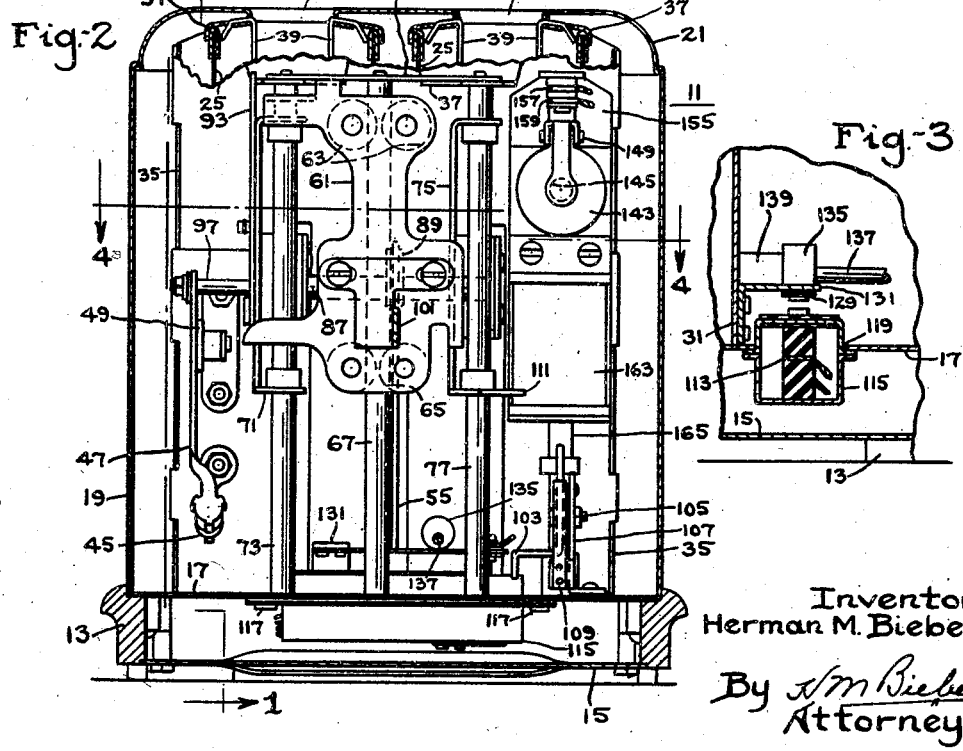
Inventor:
Herman M. Biebel.
By *H M Biebel*
Attorney.

April 9, 1940.  H. M. BIEBEL  2,196,380
AUTOMATIC TOASTER
Filed Feb. 20, 1939  2 Sheets-Sheet 2
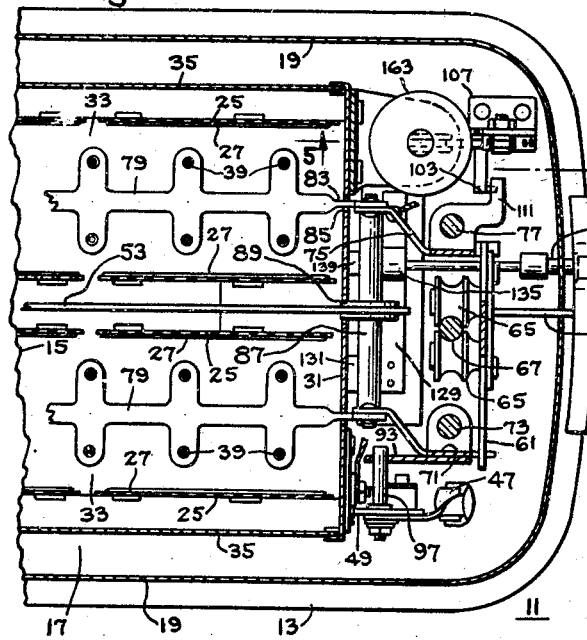
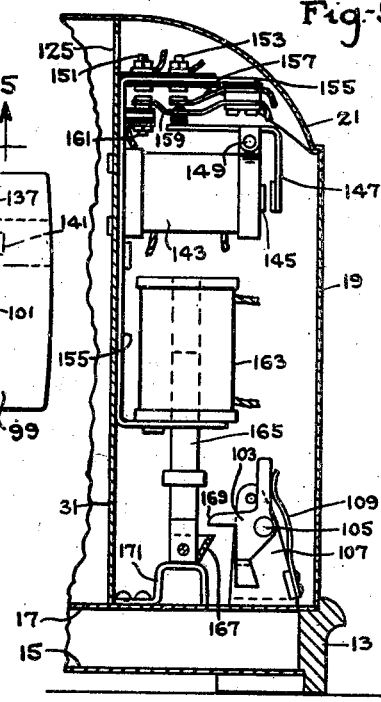
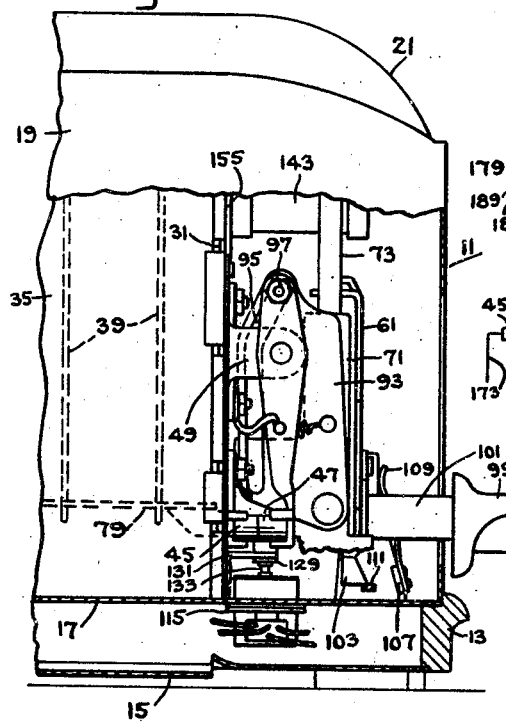
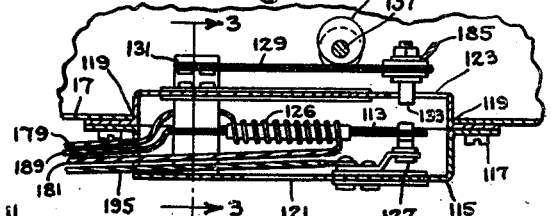
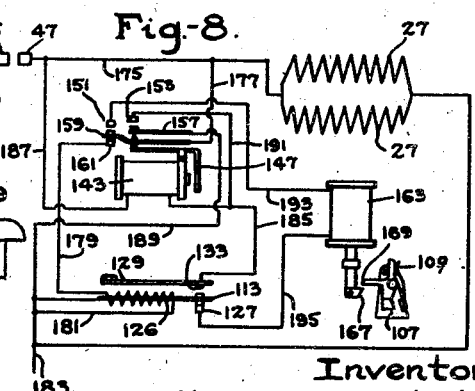
Inventor:
Herman M. Biebel.
By H M Biebel
Attorney.

Patented Apr. 9, 1940

2,196,380

UNITED STATES PATENT OFFICE 2,196,380

AUTOMATIC TOASTER

Herman M. Biebel, Elgin, Ill., assignor to McGraw Electric Company, Elgin, Ill., a corporation of Delaware Application February 20, 1939, Serial No. 257,301

5 Claims. (Cl. 219—19)

My invention relates to cooking devices and particularly to automatic electric toasters.

Among the objects of my invention are the following:

To provide a relatively simple thermal timing device for an automatic electric toaster;

To provide an all electric thermal timing device for an automatic electric toaster that shall be highly sensitive in its operation;

To provide a thermal timing device for an automatic electric toaster that shall embody a thermal element responsive to toaster chamber temperature to insure substantially uniform toasting of successive slices of bread irrespective of changes in the temperature of the toaster;

And finally to provide a thermal timing device operating on the heat-up cool-off principle during any one toasting operation.

In the drawings,

Figure 1 is a vertical sectional view on the line 1—1 of Fig. 2 showing a part of a baffle plate broken away to disclose certain inner parts, Fig. 2 is a view in front elevation showing the casing in section and taken on the line 2—2 of Fig. 1, Fig. 3 is a fragmentary vertical sectional view taken on the line 3—3 of Fig. 7, Fig. 4 is a fragmentary horizontal sectional view taken on the line 4—4 of Fig. 2, Fig. 5 is a fragmentary vertical sectional view taken on the line 5—5 of Fig. 4 showing particularly the detent and the electric releasing mechanism, Fig. 6 is a fragmentary view showing a part of the device shown in Fig. 1 but with the parts positioned in operating or toasting positions, Fig. 7 is an enlarged vertical sectional view taken on the line 7—7 of Fig. 1 showing a main bimetal bar, its associated contact members and an auxiliary or compensating bimetal bar, and Fig. 8 is a schematic wiring diagram used in my improved toaster control means.

An automatic electric toaster assembly 11 includes a frame 13 which may be made of moulded composition material having a crumb tray 15 secured thereto and having also a base plate 17 of thin sheet metal secured thereto in any suitable or desired manner at the top surface of member 13. A casing 19 having front, rear and side walls, is mounted on member 13 and may be held thereon in any suitable or desired manner now well known in the art. A cover member 21 is provided at the upper end of casing 19, which is provided with one or more slots 23 therein through which slices of bread may be inserted into and removed from the toasting chamber.

A plurality of planar heating elements include respectively one or more vertically extending thin sheets of electric-insulating material 25 on which is wound a heating resistor 27 all in a manner now well known in the art. I prefer to provide a pair of spaced electric heating elements of the kind just above described for each slice of bread adapted to be toasted in the toaster. While I have shown my toaster as being provided with four such electric heating elements, my invention is not limited to such number and I may use either a greater or a lesser number of such pairs of heating elements.

The outermost heating elements and particularly the sheets of electric insulating material 25 thereof cooperate with a rear intermediate wall 29 and a front intermediate wall 31, both preferably of thin sheet metal, to inclose a toasting chamber, the bottom of which is constituted by plate 17 and the top of which may be constituted by cover 21. The bottom plate 17 may be provided with openings 33 therein registering with the space between pairs of heating elements and with the openings 23 in the cover to permit of proper ventilation of the toasting chamber, when the toaster is in operation. In order to reduce the loss of heat outwardly from the outermost heating elements I may provide baffle plates 35 at each side of the toaster. A pair of top frame plates 37 are provided, one for each slice of bread, which plates may be used to properly locate the upper edges of the heating elements and which may also be used to support guard and guide wires 39 in a manner well known in the art.

Terminal members 41 (see Fig. 1) may be insulatedly mounted on the rear intermediate wall 29 and a twin conductor cord 43 may be provided to permit of energizing the heating elements of the toaster all in a manner well known in the art.

Means for controlling the energization of the main heating resistor elements 27 may include a fixed contact 45 insulatedly mounted on the front intermediate wall 31 near the bottom thereof and a contact or switch-arm 47 pivotally mounted on a bracket 49 which bracket is insulatedly supported on the front intermediate wall 31. The fixed contact 45 and the arm 47 are connected in series circuit with the resistors 27 by conductors not shown in detail.

Means for biasing the switch-arm 47 to the position shown in Fig. 1 of the drawings where it is out of engagement with the fixed contact 45 and the energizing circuit is therefore open, may comprise a bellcrank lever 51 having a long substantially horizontally-extending arm 53 and a depending shorter arm 55. The bellcrank lever 51 is pivotally supported at 57 on a pivot pin which may be suitably supported on the rear intermediate wall 29. A biasing spring 59 has one end thereof connected with the lower end of arm 55 while its other end is adapted to engage with any one of a plurality of teeth now shown provided near the forward edge of base plate 17, all in a manner known in the art.

Means for initiating a toasting operation includes a carriage 61 having an upper pair of rollers 63 and a lower pair of rollers 65, engaging on opposite sides of a central vertical standard 67, the lower end of which fits into and is held by the base plate 17 while the upper end thereof fits into a cross bar 69, the ends of which may be supported by the pair of upper frame plates 37 all in a manner well known in the art. A slider 71 is adapted to move vertically and reciprocally on a left-hand standard 73 and a second slider 75 is adapted to move on a right-hand vertical standard 77, the lower ends of which standards may fit into and be held by the base plate 17 and the upper ends of which may fit into and be held by forwardly extending portions of top frame plates 37 and of the cross bar 69, all of these details being well known in the art. Bread carriers 79, in this case two in number, are severally adapted to move vertically in the space between each pair of cooperating heating elements 25 and have rear end portions extending through and moving in vertical slots 81 in rear intermediate wall 29 while forwardly extending portions 83 move in slots 85 in front intermediate wall 31. The portions 83 are secured to the respective sliders 71 and 75 which have rearwardly extending portions for that purpose. A cross rod 87 is secured to the slider 71 and 75 and may have a roller 89 thereon which is adapted to move in a slot 91 in the forward end of arm 53.

A plate 93 having an angular slot 95 therein is secured to and against the outer face of slider 71, and a pin 97 projecting laterally from the upper end of switch-arm 47 is adapted to move in the slot 95, the design construction and adjustment of these parts being such that when the operator presses on a knob 99 positioned on the outside of the casing and secured on a member 101 mounted on carriage 61, the carriers 79 will be moved downwardly from the non-toasting position shown in Fig. 1 to the toasting position shown in Fig. 6 of the drawings, the coil spring 59 will be placed under tension, and switch-arm 47 will be caused to turn in a clockwise direction to close the circuit through the main heaters 27.

I have described in some detail the structural elements of a toaster assembly with which the parts now to be described and more particularly constituting my invention may be associated. It is obvious, however, since all of the hereinbefore described details are old, that I am not limited to only such details, as these have been shown and described for illustrative purposes only.

It may be here pointed out that I provide a detent member 103 for the bread carriers, shown particularly in Figs. 1 and 5 of the drawings, which detent is pivotally mounted at 105 in a bracket 107 and is biased by a spring 109 to a position where it may engage with a lug 111 secured to or part of right-hand slider 75. When the knob 99 has been moved downwardly by an operator to initiate a toasting operation, member 111 will be engaged below the lower end of detent 103, as seen more particularly in Fig. 6 of the drawings, so that for a limited time the switch remains closed and the bread carriers are in their toasting position with any slice or slices of bread supported thereby subject to heat from the heating resistors 27 to cause toasting. Certain of the movable parts hereinbefore described constitute the means for initiating a toasting operation and means for terminating a toasting operation will now be described, these means constituting more particularly my present invention.

A main bimetal element 113 which may for convenience be called the main thermobar, is insulatedly supported in a small casing 115 which casing is secured to the under side of base plate 17 in any suitable or desired manner, which may include a plurality of short machine screws 117 as is shown more particularly in Fig. 7 of the drawings. While a part of the casing is located below the base plate 17, I may have the upper part thereof extend above the base plate 17 an opening 119 (Fig. 3) being provided in the base plate to permit of such location. The bottom wall or a side of the casing 115 may be provided with one or more openings 121 (Fig. 7) and the upper wall of the casing 115 may be provided with at least one opening 123 therein in order to permit of a through draft of cooling air to flow through the casing 115 when the toaster is in operation. It may be here noted that an opening 125 (see Fig. 5) may be provided in front intermediate wall 31 to permit of such draft of cooling air flowing through the casing 115 and out through one of the openings 23.

The main thermobar 113 may have an auxiliary heating resistor 126 insulatedly mounted thereon or if desired, I may provide any other suitable supporting means for this heating resistor in a manner well known in the art. A fixed contact member 127 is insulatedly supported in the casing 115 as from the bottom wall thereof.

A compensating or auxiliary thermobar 129 is supported in close heat-receiving relation to and with the front intermediate wall 31 as by a metal bracket 131 (see Fig. 3). A contact member 133 is insulatedly mounted on and supported by the free or movable end of thermobar 129. It may be here pointed out that it is desired that auxiliary thermobar 129 be subject to heat from the toasting chamber transmitted through the front intermediate wall 31 thereof and through the bracket 131 and I may make the engaging surface of the bracket 131 and of the front intermediate wall 31 relatively large in order to have a relatively large amount of heat transmitted from the toasting chamber structure to the thermobar 129, which is eff :ted by the reduction of the thermal reluctance (of the heat path) between the thermobar 129 and the toasting chamber hereinbefore described.

Manual means for varying or adjusting the initial position of compensating thermobar 129 may include a cam 135 positioned on a shaft 137 which shaft may have a rear bearing 139 (see Fig. 3) and which may extend outwardly through an opening in the front wall of casing 19 and be actuable by a small knob 141.

An electromagnetic relay includes a coil 143 having magnetic core 145 therein and having an armature 147 of substantially L-shape pivotally mounted thereon as at 149 (see particularly Fig. 5).

A plurality of fixed contact members 151 and 153 are insulatedly mounted on a bracket 155 which bracket may be constituted by a metal strip of flat channel shape secured to the front intermediate wall 31 (see Fig. 5). A pair of spring contact members 157 and 159 are also insulatedly supported on the bracket 155 as shown particularly in Fig. 5 of the drawings, spring contact 157 being adapted to engage with contact member 153 but being normally biased away therefrom. Spring contact 159 is adapted to be moved into engagement with contact 151 by armature 147 when coil 143 is energized but is normally biased into engagement with a fixed contact member 161 insulatedly mounted on bracket 155.

An electromagnetic detent release means is also supported from bracket 155 and includes a solenoid 163 having an armature core 165 vertically movable therein, which core has at its lower end a pivotally mounted release member 167 which member is adapted to move past a rearwardly projecting lug 169 of detent 103 when the armature core 165 moves downwardly but which member is adapted to engage and cause clockwise turning releasing movement of detent 103 when core member 165 moves upwardly on energization of coil 163. A stop 171 may be provided to limit the downward movement of core 165.

Referring now particularly to Fig. 8 of the drawings, I have there shown a wiring diagram of the toaster, two resistors 27 only being shown although any desired number of such resistors are to be considered as being indicated thereby. On downward movement of knob 99 to initiate a toasting operation with attendant downward movement of the carriage, sliders and bread carriers and engagement of contact members 47 and 45 not only will the heating resistors 27 in the toaster be energized but the auxiliary heating coil 126 will also be energized, the circuit therefor being as follows: From supply circuit conductor 173 through switch contacts 45 and 47, conductors 175 and 177 through spring contact 159 to contact 161, conductor 179, auxiliary heating resistor 126 and through a conductor 181 to the other supply circuit conductor 183. By reference to Fig. 8 of the drawings it will be noted that main thermobar 113 and particularly a contact member thereon may initially be in engagement with fixed contact member 127 but any circuit including these parts will be incomplete since it is open at contact member 151.

Energization of the auxiliary heater 126 causes an increase in temperature of the main thermobar 113 which is so designed and constructed that its free end will move upwardly in a counterclockwise direction when heated. At a given position of the auxiliary or compensating thermobar 129 the main thermobar 113 will engage with contact member 133 on thermobar 129 whereby the following circuit will be established: from supply circuit conductor 173 through contacts 45 and 47, conductor 187, coil 143 of the relay, conductor 185, contact 133, through thermobar 113, to the other supply circuit conductor 183. The energized coil 143 actuates the pivotally mounted armature 147 causing movement of the spring contacts 157 and 159 in a clockwise direction whereby the energizing circuit through resistor 126 is interrupted by disengagement of contact member 159 from contact member 161. At the same time a holding circuit is established for coil 143 as follows: From supply circuit conductor 173 through contacts 45 and 47, through conductor 187, through coil 143, conductor 191 to fixed contact 153, contact spring 157, through conductor 189 and to the other supply circuit conductor 183. This insures that the coil 143 of the relay will remain energized even though the main thermobar 113 on cooling moves in a clockwise direction to disengage contact member 133.

At the same time a detent releasing circuit is prepared as follows: From supply circuit conductor 173 through contacts 45 and 47, conductors 175 and 177, spring contact 159, contact 151, conductor 193, coil 163 of the detent releasing means and through a conductor 195 to contact member 127.

When the main thermobar 113 has been cooled to a predetermined lower temperature it will have moved in a clockwise direction and the contact member thereon will engage fixed contact member 127 whereby the initially incomplete energizing circuit through coil 163 of the electromagnetic detent release means will be closed through main thermobar 113 and to supply circuit conductor 183. This causes upward movement of core 165 with attendant turning movement of detent 103 in a clockwise direction because of the engagement of member 167 with lug 169, whereby termination of a toasting operation is effected, the spring 59 causing upward movement of the carrier 79 and simultaneous deenergization of the main or toasting resistors 27, by disengagement of the contacts 45 and 47.

I may here point out that the main thermobar 113 is preferably so positioned with relation to the toasting chamber and the main heating resistors therein, as to be only slightly affected thereby. The cooling draft of air entering the casing 115 at opening 121 and leaving the casing at the upper opening 123 flowing upwardly in the small chamber in front of front intermediate wall 31 and then through opening 125, will assist materially in quick cooling of the main thermobar 113 when such cooling is in order after deenergization of the auxiliary heating element operatively associated therewith.

On the other hand the auxiliary or compensating thermobar 129 is subject to toaster temperature or to the temperature of the toasting chamber. Its construction is such that upon increase of temperature thereof it will move its free end in a clockwise direction thereby reducing the length of time elapsing between the energization of auxiliary heater 126 and the instant when contact member 133 is engaged to cause the actions and operation already hereinbefore described as to the deenergization of the auxiliary heater 126 and energization of coil 143 of the relay. It is obvious that the distance between contact 133 and the contact on arm 113 decreases with increase in toaster temperature to which the bimetal bar 129 is subjected. This will result in decreasing the duration of a toasting operation with increased temperature of the toaster assembly.

It is also obvious that this length of time of the heat-up portion of the cycle of the main thermobar 113 can be varied by manual adjustment of the cam 135 to vary the initial position of thermobar 129 relatively to thermobar 113.

The device embodying my invention thus provides a relatively simple and compact thermal timing means operating on the heat-up, cool-off principle to control the duration of a toasting operation. It is obvious that the use of electromagnets makes it possible for the control members and particularly the main and the auxiliary thermobar to be made relatively light and therefore to have a relatively small thermal mass and thermal lag which of course makes for increased sensitivity to temperature changes. It is further obvious that since relatively slight pressures only are necessary for the engaging contact members, the main and the auxiliary thermobar need not be subjected to relatively large mechanical stresses thereby insuring that any adjustment made at the factory will remain unchanged over long periods of time under ordinary operating conditions.

While I have illustrated and described a particular embodiment of my invention, I do not desire to be limited strictly thereto since modifications within the scope of the appended claims can be made.

I claim as my invention:

1. In an automatic electric toaster, the combination with a main electric heater energizable only during a toasting operation, a control switch for said main heater biased to open position, a detent for holding said switch closed, an electromagnetic release means for said detent and a thermal timing means comprising an auxiliary heater and a single thermobar adapted to be heated up by said auxiliary heater and then cooled off during a given toasting operation, of an electromagnetic relay including a solenoid and contacts actuable thereby and electric connections between said relay, its contacts and said thermobar whereby on closing said control switch to initiate a toasting operation said auxiliary heater is energized through normally closed relay contacts, said thermobar thereupon being heated and becoming effective, when heated to a predetermined temperature, to energize said solenoid to open the circuit through said auxiliary heater, to cause said solenoid to close a holding circuit for itself and to prepare a circuit through said electromagnetic release means, cooling of said thermobar to a predetermined lower temperature causing closing of a circuit through said electromagnetic release means and termination of a toasting operation and opening of all circuits in the toaster.

2. In an automatic electric toaster, the combination with a casing, a main electric heater therein energizable only during a toasting operation and means for initiating a toasting operation, of means for terminating a toasting operation comprising a main thermobar out of close heat receiving relation to said main heater, an auxiliary electric heater for heating said main thermobar, an auxiliary thermobar in close heat receiving relation to said main heater, and carrying a contact, an electromagnetic relay including a coil and a plurality of contacts controlled thereby, electric connections between said relay coil, contacts and said main thermobar, initiation of a toasting operation causing energization of said main and auxiliary heater, said main thermobar being effective when it has been heated to a predetermined temperature to effect energization of said relay coil and of a holding circuit therefor and deenergization of said auxiliary heater, said main thermobar thereupon cooling and effecting termination of a toasting operation when it has cooled to a predetermined lower temperature, said auxiliary thermobar closely following toaster temperature and cooperating with the main bimetal bar to cause substantially uniform toasting of successive slices of bread irrespective of changes in operating conditions of the toaster.

3. In an automatic electric toaster, the combination with a casing, a main electric heater therein energizable only during a toasting operation and means for initiating a toasting operation, of means for terminating a toasting operation comprising a main thermobar, an auxiliary electric heater for heating said main thermobar, a ventilated casing in which said main thermobar and said auxiliary heater mounted to substantially heat insulate them from the main electric heater, an auxiliary thermobar mounted in close heat receiving relation to said main electric heater and carrying a contact, an electromagnetic relay having contacts thereon, electric connections between said main thermobar, relay coil and said contacts, actuation of said initiating means causing current flow through said main and said auxiliary heaters, said main thermobar being effective when heated to a predetermined temperature to engage the contact on said auxiliary thermobar and energize said relay coil, said coil thereupon effecting movement of certain of its contacts to deenergize said auxiliary heater said main thermobar then cooling and terminating a toasting operation when its temperature has reached a predetermined low value.

4. A device as set forth in claim 3 and including a manually actuable mechanical means for varying the initial position of said auxiliary thermobar to vary the duration of a toasting operation.

5. In an automatic electric toaster, the combination with a main electric heater, a control switch therefor biased to open position, a detent for holding said switch in closed position and an electromagnetic release means for said detent, of a thermal timing means for determining the duration of a toasting operation in accordance with the temperature of the toaster, said timing means including an auxiliary electric heater, a main thermobar to be heated by said auxiliary heater, a ventilated casing enclosing said auxiliary heater and said thermobar and substantially shielding them from the heat of the toaster, an auxiliary thermobar subject to the heat of the toaster, a plurality of contacts electromagnetically controlled by said main thermobar, closing of said control switch causing energization of said main and said auxiliary heater, said main thermobar being effective when it has been heated to a predetermined high temperature to effect deenergization of the auxiliary heater and cooling of the main thermobar, said main thermobar becoming effective to energize the electromagnetic detent release when the temperature of the main thermobar has reached a predetermined low value, the auxiliary thermobar cooperating with the main thermobar to energize the detent release sooner when a toaster is operated at a high temperature than would occur when a toaster is operated at a lower temperature.

HERMAN M. BIEBEL.